(12) United States Patent
Zarakas et al.

(10) Patent No.: US 10,453,054 B2
(45) Date of Patent: Oct. 22, 2019

(54) UTILIZING A TRANSACTION CARD TO PROVIDE SECONDARY AUTHENTICATION FOR ACCESSING A SECURE APPLICATION WITH A USER DEVICE

(71) Applicant: Capital One Services, LLC, McLean, VA (US)

(72) Inventors: James Zarakas, Centreville, VA (US); Molly Johnson, Alexandria, VA (US); Robert Perry, Ashburn, VA (US); Adam Koeppel, Washington, DC (US); Tyler Locke, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 15/867,233

(22) Filed: Jan. 10, 2018

(65) Prior Publication Data
US 2019/0213581 A1    Jul. 11, 2019

(51) Int. Cl.
*G06Q 20/30* (2012.01)
*G06Q 20/36* (2012.01)
(Continued)

(52) U.S. Cl.
CPC ......... *G06Q 20/3674* (2013.01); *G06F 3/017* (2013.01); *G06F 21/35* (2013.01);
(Continued)

(58) Field of Classification Search
CPC ............. G06Q 20/3674; G06Q 20/105; G06Q 20/3227; G06Q 20/3278; G06F 3/017;
(Continued)

(56) References Cited

U.S. PATENT DOCUMENTS 9,571,164 B1 * 2/2017 Luo ..................... H04B 5/0056
2007/0118745 A1   5/2007 Buer
(Continued)

FOREIGN PATENT DOCUMENTS

WO    2014062623 A1    4/2014
WO    2016015054 A1    1/2016

OTHER PUBLICATIONS

Extended European Search Report for Application No. EP19150714. 4, dated May 27, 2019, 9 pages.

*Primary Examiner* — James D Nigh
(74) *Attorney, Agent, or Firm* — Harrity & Harrity, LLP

(57) ABSTRACT

A transaction card includes a near-field communication (NFC) component, a security component, a wireless component, one or more memories, and one or more processors communicatively coupled to the one or more memories. The device receives a signal from a user device attempting to access a secure application, and energizes the NFC component based on the signal received from the user device. The device causes the security component to generate an encrypted code based on the NFC component being energized, and provides, via the security component, the encrypted code to the wireless component. The device provides, via the wireless component, the encrypted code to the user device to permit the user device to utilize the encrypted code as authentication for accessing the secure application.

20 Claims, 12 Drawing Sheets

(51) Int. Cl.
    *G06Q 20/32*     (2012.01)
    *G06Q 20/10*     (2012.01)
    *H04L 9/08*     (2006.01)
    *G06F 21/35*     (2013.01)
    *G06F 3/01*     (2006.01)
    *H04L 29/06*     (2006.01)
    *H04W 4/80*     (2018.01)
    *H04W 84/12*     (2009.01)

(52) U.S. Cl.
    CPC ....... *G06Q 20/105* (2013.01); *G06Q 20/3227* (2013.01); *G06Q 20/3278* (2013.01); *H04L 9/0877* (2013.01); *H04L 63/0853* (2013.01); *H04L 2463/082* (2013.01); *H04W 4/80* (2018.02); *H04W 84/12* (2013.01)

(58) Field of Classification Search
    CPC ... G06F 21/35; H04L 9/0877; H04L 63/0853; H04L 2463/082; H04W 4/80; H04W 84/12
    USPC .......................................................... 705/67
    See application file for complete search history.

(56) References Cited

U.S. PATENT DOCUMENTS

| | | | | |
|---|---|---|---|---|
| 2009/0145964 A1* | 6/2009 | Blythe | ............. | G06K 19/06187 235/380 |
| 2013/0144793 A1* | 6/2013 | Royston | ............ | H04W 52/0261 705/72 |
| 2013/0211929 A1* | 8/2013 | Itwaru | ................ | G06Q 20/4012 705/16 |
| 2013/0228616 A1* | 9/2013 | Bhosle | ................. | G06Q 20/227 235/375 |
| 2013/0320080 A1* | 12/2013 | Olson | ................... | H04W 76/10 235/380 |
| 2014/0181955 A1 | 6/2014 | Rosati | | |
| 2014/0279546 A1* | 9/2014 | Poole | ................... | H04B 5/0031 705/44 |
| 2015/0032635 A1* | 1/2015 | Guise | .................. | G06Q 20/356 705/72 |
| 2015/0134513 A1* | 5/2015 | Olson | .............. | G06K 19/06206 705/39 |
| 2015/0149365 A1* | 5/2015 | Mobini | ................ | G06Q 20/382 705/75 |
| 2015/0170014 A1* | 6/2015 | Olson | .................. | G06Q 20/354 235/380 |
| 2015/0220109 A1* | 8/2015 | von Badinski | ......... | G01P 15/00 340/539.12 |
| 2016/0057627 A1* | 2/2016 | Burgbacher | ...... | G06K 19/07345 455/41.1 |
| 2016/0189143 A1* | 6/2016 | Koeppel | ............ | G06K 19/0739 705/41 |
| 2016/0261411 A1 | 9/2016 | Yau et al. | | |
| 2016/0307190 A1* | 10/2016 | Zarakas | ............... | G06Q 20/341 |
| 2017/0068437 A1* | 3/2017 | Warren | ................ | G06F 3/04883 |
| 2017/0154328 A1 | 6/2017 | Zarakas et al. | | |
| 2017/0228631 A1* | 8/2017 | Larsen | ............ | G06K 19/07354 |
| 2017/0323166 A1* | 11/2017 | Colussi | ............ | G06K 9/00892 |
| 2018/0005227 A1* | 1/2018 | Sandelov | ............ | H04W 76/10 |
| 2018/0120892 A1* | 5/2018 | von Badinski | ....... | G06F 3/1423 |

* cited by examiner

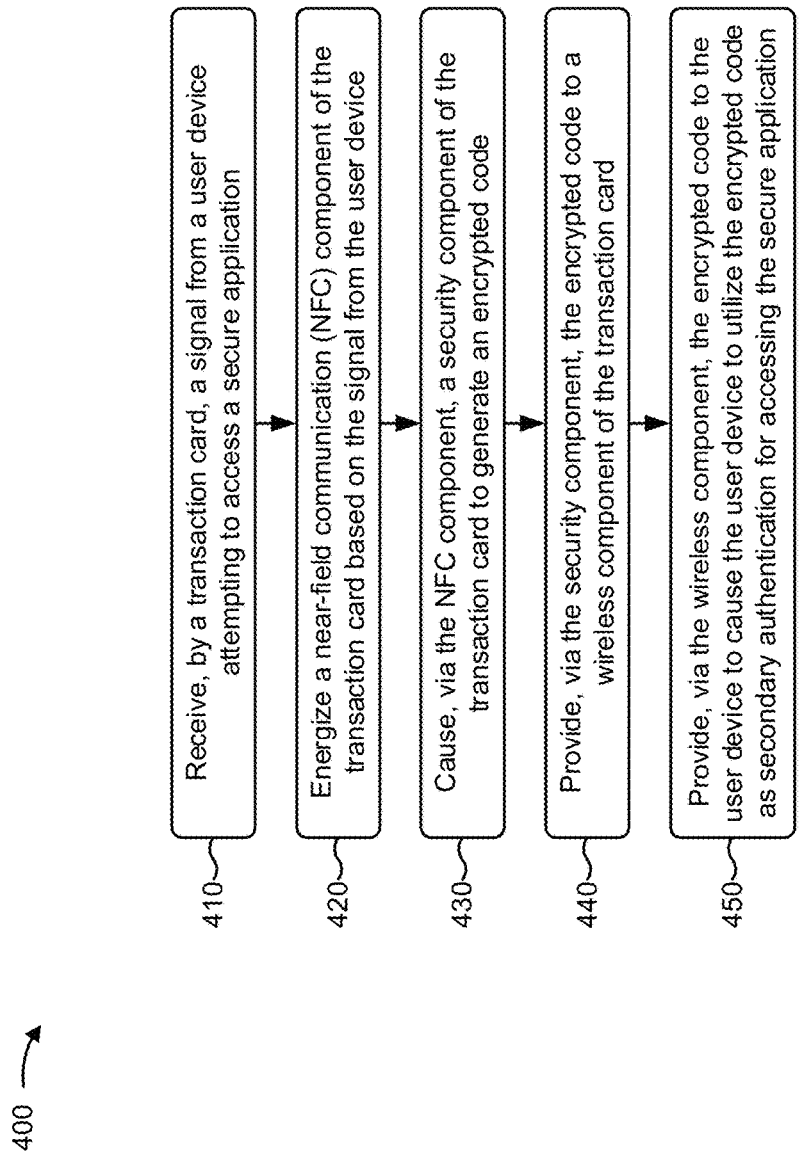

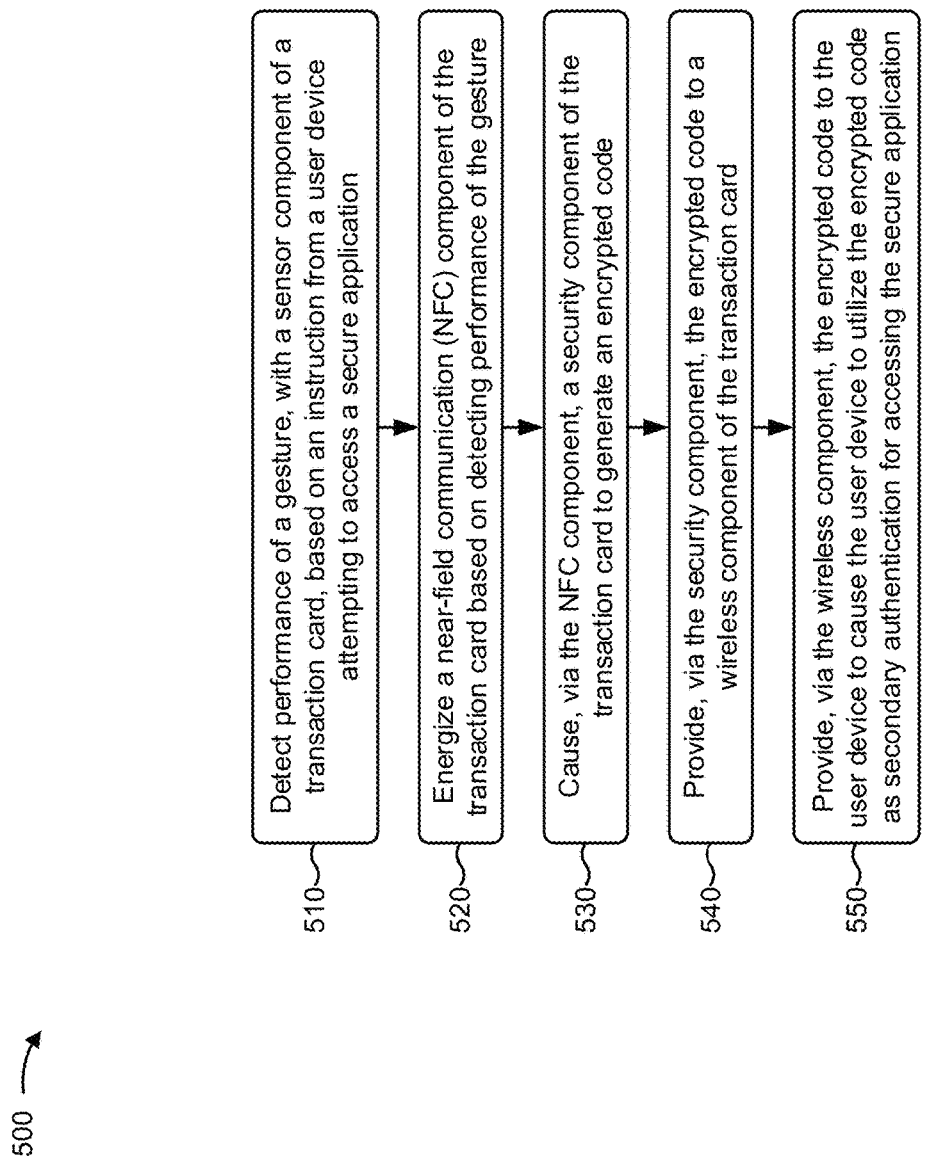

US 10,453,054 B2

UTILIZING A TRANSACTION CARD TO PROVIDE SECONDARY AUTHENTICATION FOR ACCESSING A SECURE APPLICATION WITH A USER DEVICE

BACKGROUND

Consumers utilize user devices, such as smart phones and/or computers, to perform many online transactions, such as applying for a loan, paying a bill, checking a bank account, transferring funds, and/or the like. With standard online security procedures only requiring a user name and a password, it has become increasingly easy for criminals to gain access to private data of the consumer, such as personal and financial data, and then use that private data to commit fraudulent acts. Therefore, when performing such transactions, a consumer is typically required to provide multi-factor authentication, such as two factor authentication, before such transactions occur.

SUMMARY

According to some implementations, a transaction card includes a near-field communication (NFC) component, a security component, a wireless component, one or more memories, and one or more processors communicatively coupled to the one or more memories. One or more of the NFC component, the security component, the wireless component or the one or more processors are to receive a signal from a user device attempting to access a secure application, and energize the NFC component based on the signal received from the user device. The one or more of the NFC component, the security component, the wireless component or the one or more processors are to cause the security component to generate an encrypted code based on the NFC component being energized, and provide, via the security component, the encrypted code to the wireless component. The one or more of the NFC component, the security component, the wireless component or the one or more processors are to provide, via the wireless component, the encrypted code to the user device to permit the user device to utilize the encrypted code as authentication for accessing the secure application.

According to some implementations, a method may include receiving, by a transaction card, a signal from a user device, where the signal may be generated by the user device based on the user device attempting to utilize the user device to pay for a secure transaction. The transaction card may include a near-field communication (NFC) component, a security component, and a wireless component. The method may include energizing, by the transaction card, the NFC component based on the signal received from the user device, and instructing, by the NFC component of the transaction card, the security component to generate an encrypted code based on the NFC component being energized. The method may include generating, by the security component of the transaction card, the encrypted code based on the NFC component instructing the security component to generate the encrypted code, and providing, by the security component of the transaction card, the encrypted code to the wireless component. The method may include providing, by the wireless component of the transaction card, the encrypted code to the user device to permit the user device to utilize the encrypted code for authenticating the user device to pay for the secure transaction.

According to some implementations, a non-transitory computer-readable medium may store instructions that include one or more instructions that, when executed by one or more processors of a transaction card that includes a near-field communication (NFC) component, a wireless component, a security component, and a sensor component, cause the one or more processors to detect, via the sensor component, performance of a gesture with the transaction card, where the gesture may be performed after a user device attempts to access a secure application. The one or more instructions may cause the one or more processors to energize the NFC component based on detecting the performance of the gesture with the transaction card, and cause the security component to generate an encrypted code based on the NFC component being energized. The one or more instructions may cause the one or more processors to provide, via the security component, the encrypted code to the wireless component, and provide, via the wireless component, the encrypted code to the user device, where the user device may utilize the encrypted code as authentication for accessing the secure application.

BRIEF DESCRIPTION OF THE DRAWINGS

FIG. 4 is a flow chart of an example process for utilizing a transaction card to provide secondary authentication for accessing a secure application with a user device; and FIG. 5 is a flow chart of another example process for utilizing a transaction card to provide secondary authentication for accessing a secure application with a user device.

DETAILED DESCRIPTION

The following detailed description of example implementations refers to the accompanying drawings. The same reference numbers in different drawings may identify the same or similar elements.

Two factor authentication is an extra layer of security that requires not only a user name and a password, but also a piece of information to which only a user (e.g., a consumer) has access at the time of the transaction, such as a physical token, an access code, and/or the like. Using a user name and a password together with the piece of information to which only the user has access, makes it more difficult for potential criminals to gain access to and steal the private data of the user. For example, when a user utilizes a smart phone to access a bank account, via a banking application on the smart phone, the banking application may require that the user provide credentials (e.g., a user name and a password) for the bank account. The smart phone will provide the credentials to a bank server device, and, typically, the bank server device will provide (e.g., via a text message) a secondary authentication, such as an access code, to the smart phone. The banking application will then require the user to input the access code before access is granted to the bank account. However, such a process is cumbersome for the user and is still prone to fraudulent acts if the smart phone is stolen and being utilized by a criminal.

Some implementations described herein may utilize a transaction card to provide secondary authentication for accessing a secure application with a user device. For example, the transaction card may include a near-field communication (NFC) component, a security component, and a wireless component. The transaction card may receive a signal from a user device attempting to access a secure application (e.g., a banking application), and the NFC component may be energized based on the signal. The security component may generate an encrypted code based on the NFC component being energized, and may provide the encrypted code to the wireless component. The wireless component may provide the encrypted code to the user device to permit the user device to utilize the encrypted code as authentication for accessing the secure application.

Figure 1A:
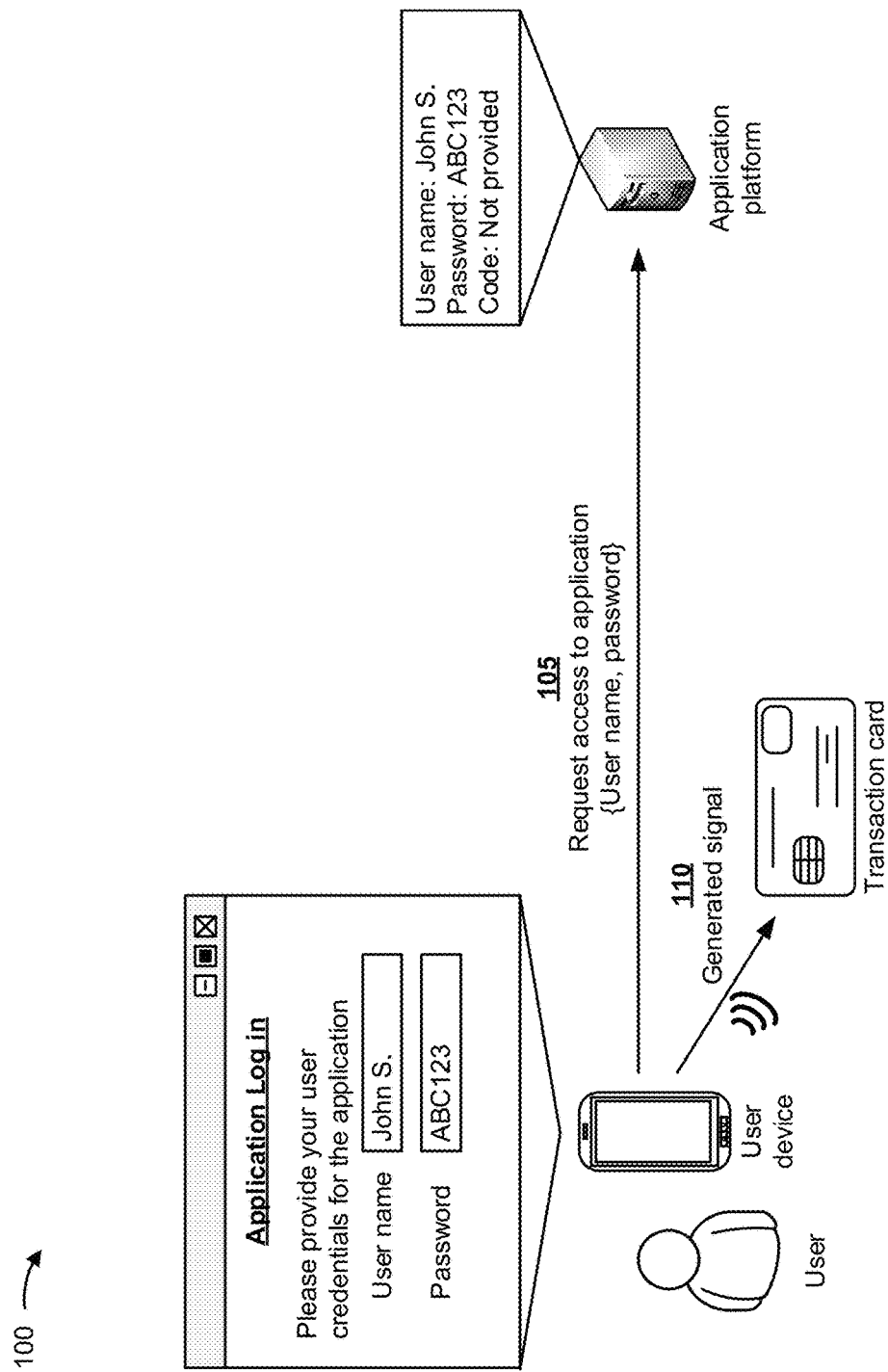
FIGS. 1A-1H are diagrams of an overview of an example implementation described herein.

FIGS. 1A-1H are diagrams of an overview of an example implementation 100 described herein. As shown in FIG. 1A, a user may be associated with a user device, a transaction card, and an application platform. Assume that the user wishes to utilize the user device to access a secure application provided by the application platform. In some implementations, the secure application may include a financial institution (e.g., banking, investment management, etc.) application, a communication (e.g., email, text, voice, etc.) application, and/or the like. In some implementations, the secure application may include a secure application provided by an entity such as a company (e.g., an application associated with confidential or proprietary information of the company, a payroll application, an employee management application, etc.), a university (e.g., a research application, a student records management application, etc.), a government agency (e.g., a military application, an intelligence organization application, a law enforcement application, a classified research application, etc.), and/or the like. As examples, the secure application may include a secure application associated with a cloud service, a retailer web site, a home security application, a social media application, a relationship or matchmaking application, an aviation application, a medical system application, an industrial application, a resource management application, a utility provider application, and/or the like).

As further shown in FIG. 1A, and by reference number 105, the user may utilize the user device to access a log in user interface of the secure application, and to generate a request to access the secure application. The request to access the secure application may include a first authentication of the user (e.g., the user credentials, such as a user name and a password). The application platform may receive the request to access the secure application, including the user name (e.g., John S.) and the password (e.g., ABC123). In some implementations, the application platform may compare the user name and the password to authentication information stored by the application platform in order to determine whether the user is authorized to access the secure application. In some implementations, in addition to the first authentication, the application platform may require the user to provide a secondary authentication (e.g., a secure access code) in order to access the secure application.

As further shown in FIG. 1A, and by reference number 110, when the user device provides the request to access the secure application to the application platform, the user device may generate a signal. In some implementations, the signal may include an electromagnetic signal based on a short-range wireless technology standard, such as a near-field communication (NFC) signal. In some implementations, if the transaction card is within close proximity (e.g., a few centimeters) to the user device, the transaction card may receive the signal generated by the user device. In some implementations, if the transaction card is not within close proximity to the user device, the transaction card may not receive the signal generated by the user device. In example implementation 100, assume that the transaction card is within close proximity to the user device and receives the signal generated by the user device.

Figure 1B:
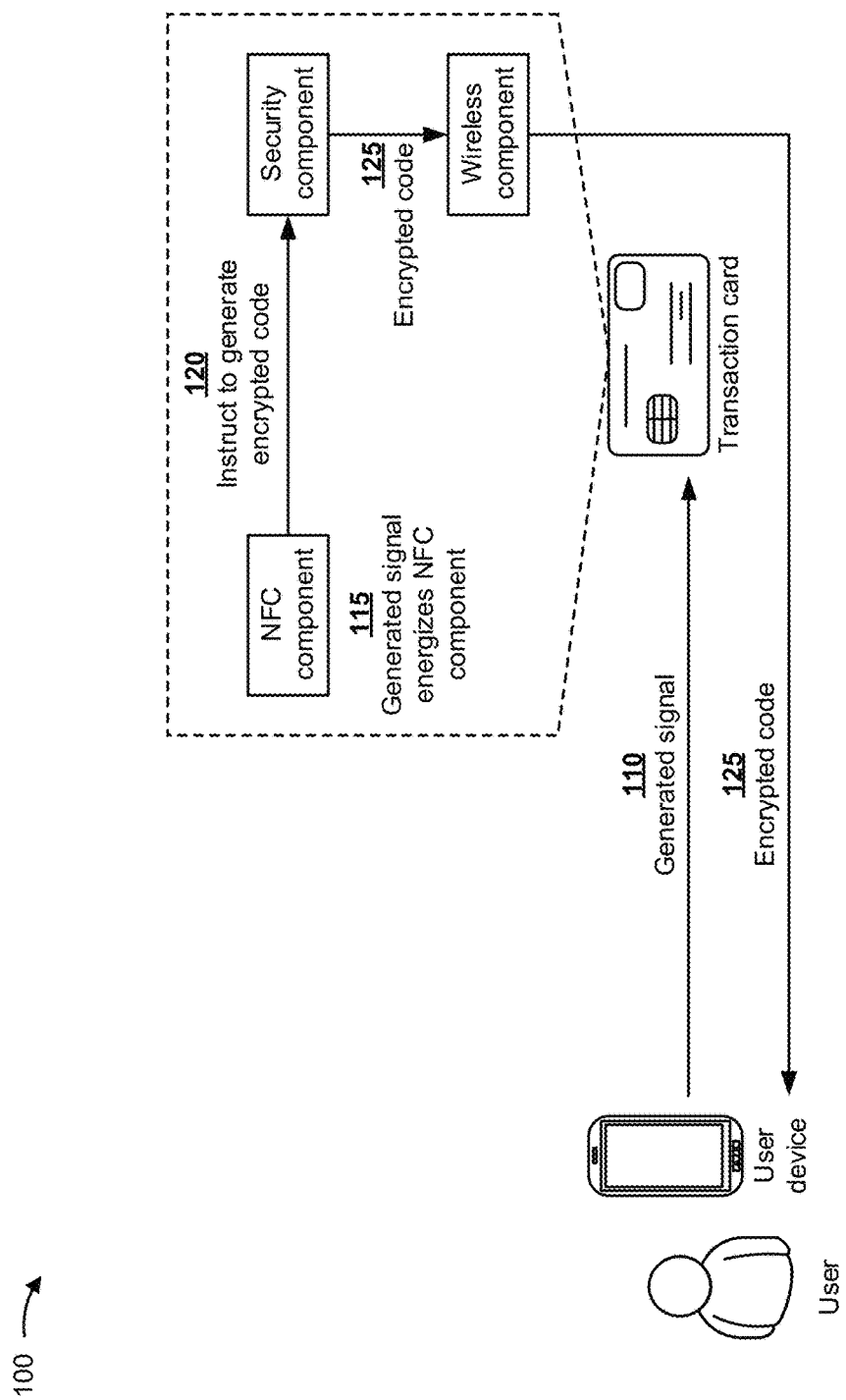

As shown in FIG. 1B, the transaction card may include a NFC component, a security component, and a wireless component, as described elsewhere herein. As further shown in FIG. 1B, and by reference number 115, when the transaction card receives the signal generated by the user device, the generated signal may cause the NFC component of the transaction card to be energized (e.g., wake up). In some implementations, the electromagnetic induction of the generated signal may cause the NFC component to be energized.

As further shown in FIG. 1B, and by reference number 120, the NFC component of the transaction card may instruct the security component of the transaction card to generate an encrypted code. In some implementations, when the NFC component is energized, the action of being energized may cause the NFC component to automatically instruct the security component to generate an encrypted code. In such implementations, the NFC component may be programmed to automatically generate the instruction for the security component whenever the NFC component detects the signal (e.g., a NFC signal) from the user device, or another device, and is energized.

As further shown in FIG. 1B, and by reference number 125, based on receiving the instruction from the NFC component, the security component of the transaction card may generate the encrypted code and may provide the encrypted code to the wireless component of the transaction card. In some implementations, the encrypted code may include a numeric code, a character code, an alphanumeric code, and/or the like that is encrypted with an encryption technology (e.g., a symmetric key encryption technology, an asymmetric key encryption technology, and/or the like). The symmetric (private) key encryption technology may include advanced encryption standard (AES) encryption, triple data encryption standard (3DES) encryption, Rivest cipher 4 (RC4) encryption, skipjack encryption, blowfish encryption, twofish encryption, serpent encryption, and/or the like. The asymmetric (public) key encryption technology may include Rivest-Shamir-Adleman (RSA) encryption, Diffie-Hellman (DH) key exchange, digital signature algorithm (DSA) encryption, elliptic-curve cryptography (ECC), and/or the like. In some implementations, the encrypted code may include a code or information that identifies the transaction card and/or that indicates that the transaction card generated the encrypted code.

In some implementations, the encrypted code may provide secondary authentication (e.g., to the user and the user device) for accessing the secure application of the application platform. In some implementations, the security component may generate, and provide to the wireless component, a secure mechanism, such as a one-time password (OTP) token, an encrypted token, an encrypted code, and/or the like.

As further shown in FIG. 1B, and by reference number 125, the wireless component of the transaction card may provide the encrypted code to the user device, and the user device may receive the encrypted code. In some implementations, the user device may store the encrypted code. In some implementations, the user device may decrypt the encrypted code to generate a code, and may display the code to the user.

Figure 1C:
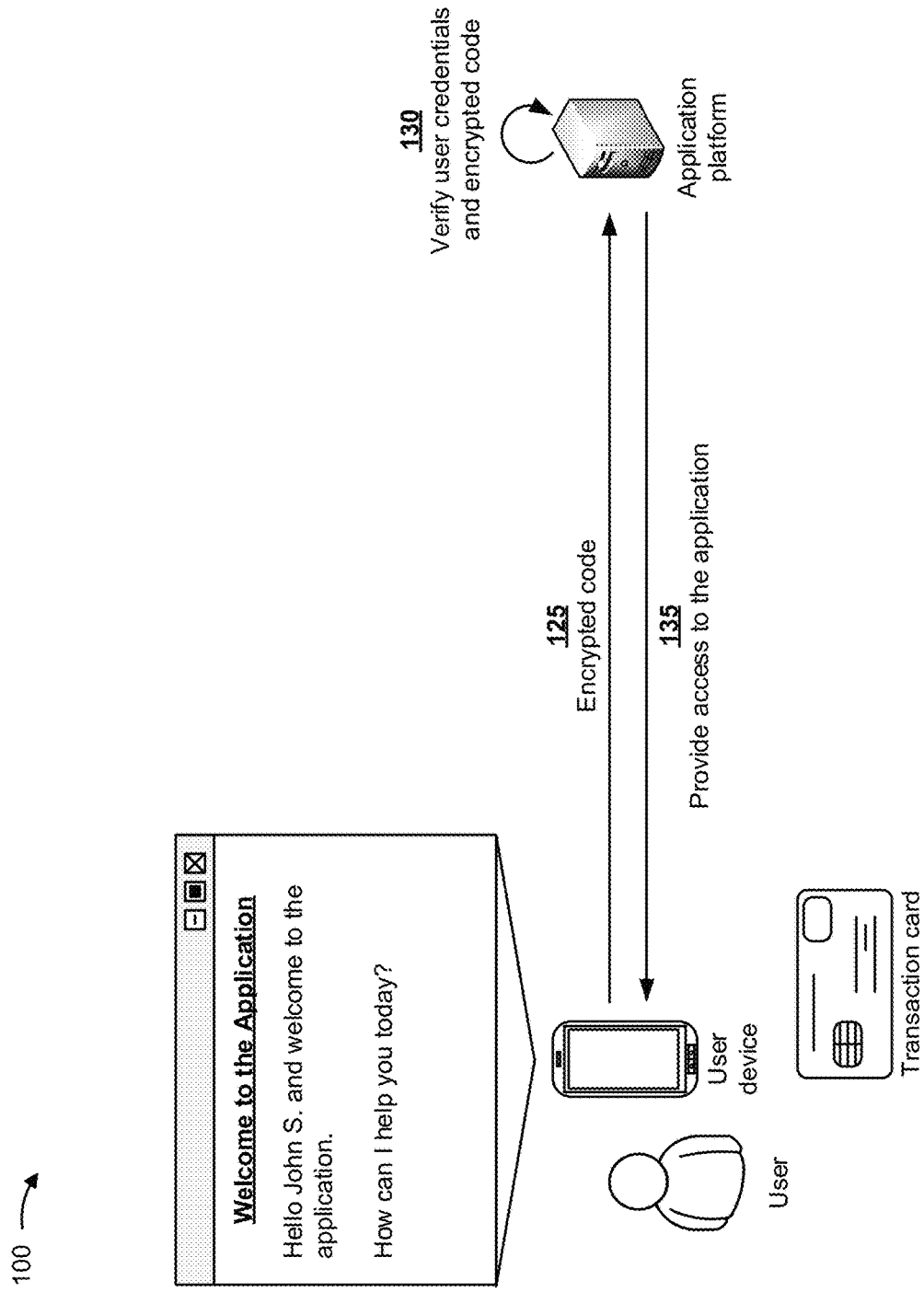

As shown in FIG. 1C, and by reference number 125, the user device may provide the encrypted code to the application platform. In some implementations, the user device may automatically provide the encrypted code to the application platform. In some implementations, when the user device decrypts the encrypted code to generate a code and displays the code to the user, the user may utilize the user device to cause the code to be provided to the application platform. In some implementations, the application platform may receive the encrypted code and may decrypt the encrypted code to generate the code. In some implementations, the application platform may receive the code and may not need to decrypt the code since the user device already decrypted the encrypted code.

As further shown in FIG. 1C, and by reference number 130, the application platform may verify the user credentials (e.g., the user name and the password) and the encrypted code. In some implementations, the user credentials may represent a first authentication factor of a two factor authentication (e.g., of the user and the user device) for accessing the secure application, and the encrypted code may represent a second authentication factor of the two factor authentication. In some implementations, the application platform may verify the user credentials (e.g., the user name and the password) and the encrypted code by comparing the user credentials and the encrypted code to authentication information (e.g., the user credentials and the code or the information that identifies the transaction card and/or that indicates that the transaction card generated the encrypted code) stored by the application platform. If the authentication information matches the user credentials and the encrypted code, the application platform may verify the user credentials and the encrypted code. If the authentication information does not match the user credentials and/or the encrypted code, the application platform may not verify the user credentials and the encrypted code.

As further shown in FIG. 1C, and by reference number 135, if the application platform verifies the user credentials and the encrypted code, the application platform may provide the user device with access to the secure application. In some implementations, if the application platform does not verify the user credentials and the encrypted code, the application platform may not provide the user device with access to the secure application. As further shown in FIG. 1C, when the user device is provided access to the secure application, the user device may display, to the user and via a user interface, information associated with the secure application.

Figure 1D:
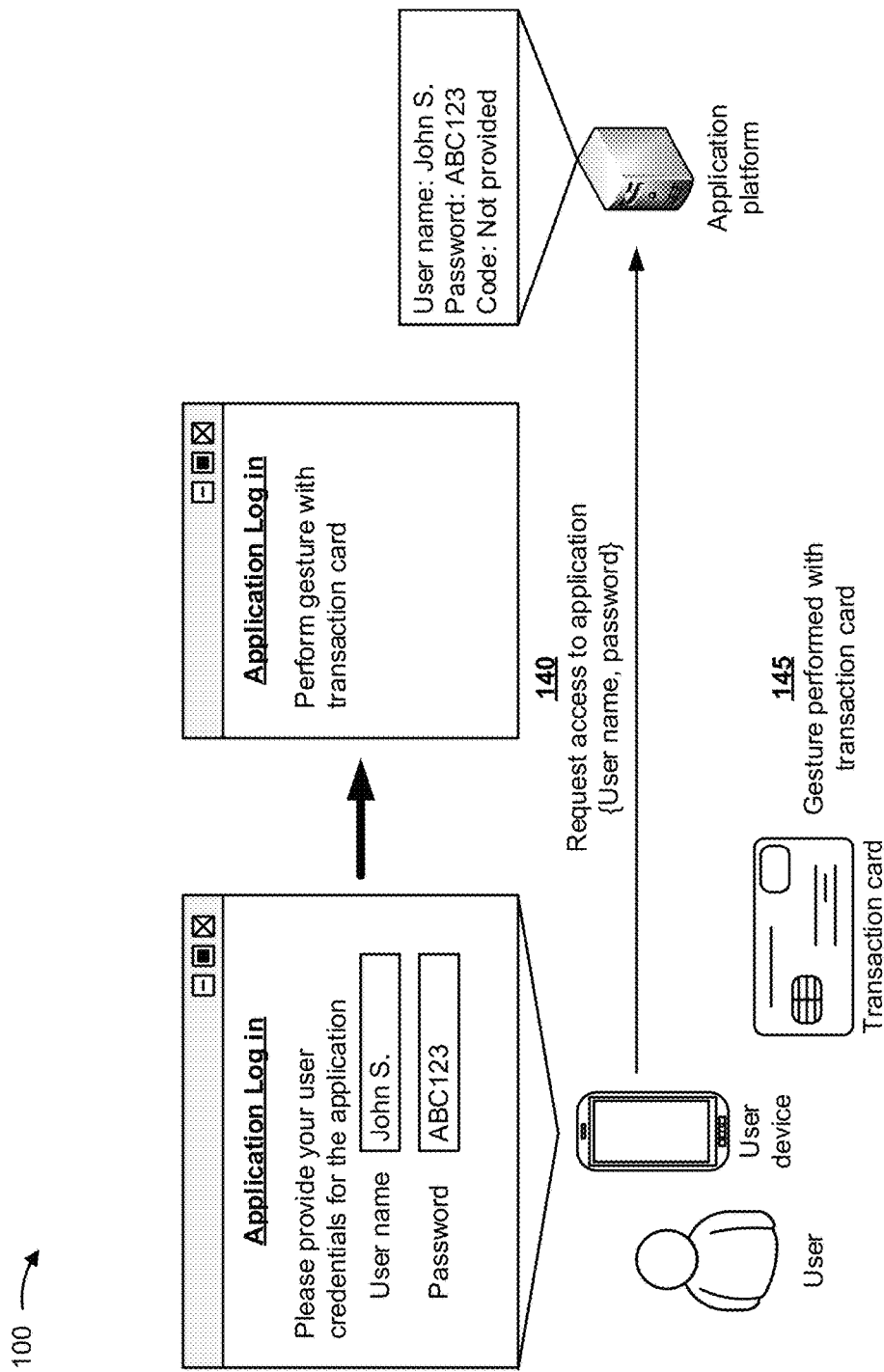

As shown in FIG. 1D, assume that the user wishes to utilize the user device to access another secure application provided by the application platform. In some implementations, the other secure application may be similar to the secure application described above in connection with FIGS. 1A-1C and will be referred to as the secure application rather than the other secure application.

As further shown in FIG. 1D, and by reference number 140, the user may utilize the user device to access a log in user interface of the secure application, and to generate a request to access the secure application. The request to access the secure application may include a first authentication of the user (e.g., the user credentials, such as a user name and a password). The application platform may receive the request to access the secure application, including the user name (e.g., John S.) and the password (e.g., ABC123). In some implementations, in addition to the first authentication, the application platform may require the user to provide a secondary authentication (e.g., a secure access code) in order to access the secure application.

As further shown in FIG. 1D, the user interface of the secure application may request that the user perform a gesture with the transaction card. In some implementations, the gesture may include a gesture of the transaction card (e.g., and sensed by the transaction card), such as moving the transaction card in a particular pattern (e.g., a back and forth, circular, elliptical, FIG. 8 or twisting motion, etc.), tapping the transaction card on the user device, flipping the transaction card, tapping the transaction card on a surface, and/or the like. For example, the secure application may request that the user move the transaction card in a particular pattern at least a threshold number of times, traverse at least a threshold distance, satisfy at least a threshold speed and/or a threshold frequency, etc.), tap the transaction card on a surface or the user device at least a threshold number of times (e.g., satisfying at least a threshold speed and/or a threshold frequency), and/or the like.

In some implementations, the gesture may include a gesture performed by the user and sensed by the transaction card, such as tapping the transaction card with a finger, moving a finger in a particular pattern on the transaction card, motioning a finger or a hand over the transaction card in a particular manner, and/or the like. For example, the secure application may request that the user motion or move a finger or hand in a particular pattern (e.g., one or at least a threshold number of times, traversing at least a threshold distance, satisfying at least a threshold speed and/or a threshold frequency, etc.), tap the transaction card with a finger at least a threshold number of times (e.g., satisfying at least a threshold speed and/or a threshold frequency), move a finger to provide a signature on the transaction card, and/or the like.

As further shown in FIG. 1D, and by reference number 145, the gesture may be performed with the transaction card, and the transaction card may sense the gesture.

Figure 1E:
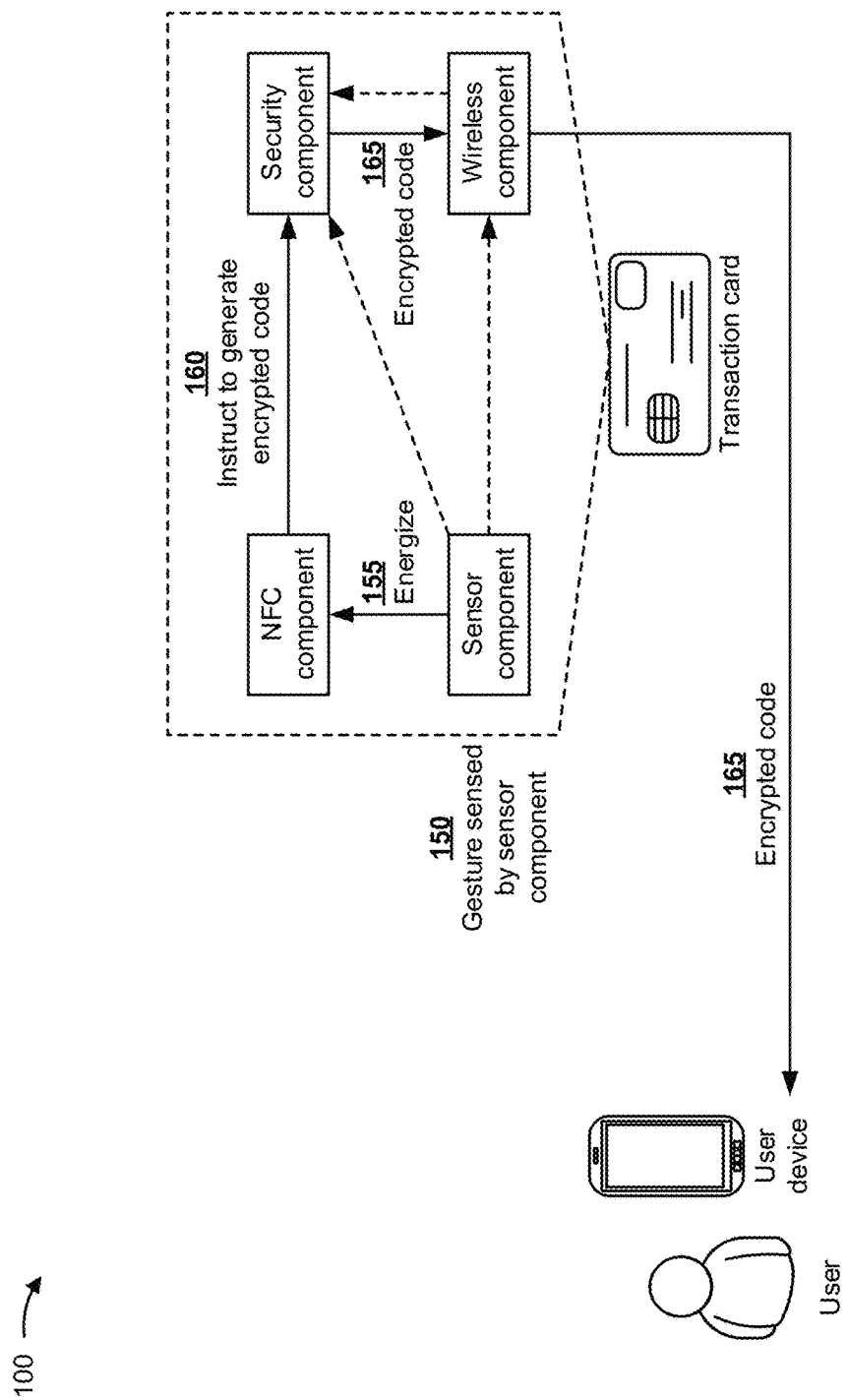

As shown in FIG. 1E, and by reference number 150, when the gesture is performed, a sensor component (e.g., an accelerometer, a light detector, and/or the like) of the transaction card may sense the gesture with the transaction card. In some implementations, if the sensor component is an accelerometer, the sensor component may sense contact with the transaction card (e.g., by a finger of the user, by the user device, and/or the like), movement of the transaction card (e.g., in a particular pattern), and/or the like. In some implementations, if the sensor component is a light sensor, the sensor component may sense non-contact with the transaction card (e.g., movement by a finger of the user around the transaction card), movement of the transaction card, and/or the like.

As further shown in FIG. 1E, and by reference number 155, when the sensor component of the transaction card senses the gesture with the transaction card, the sensor component may cause the NFC component of the transaction card to be energized (e.g., wake up). In some implementations, when the sensor component senses the gesture, the sensor component may provide an instruction, to the NFC component, that causes the NFC component to be energized. In some implementations, the transaction card or the sensor component may include a capacitive component that harvests energy from the user device when the sensor component senses the gesture. The capacitive component may utilize the energy from the user device to energize the NFC component and/or other components of the transaction card for a period of time.

As further shown in FIG. 1E, and by reference number 160, the NFC component of the transaction card may instruct the security component of the transaction card to generate an encrypted code. In some implementations, when the NFC component is energized, the action of being energized may cause the NFC component to automatically instruct the security component to generate an encrypted code. In such implementations, the NFC component may be programmed to automatically generate the instruction for the security component whenever the NFC component receives the instruction from the sensor component, and is energized.

As further shown in FIG. 1E, and by reference number 165, based on receiving the instruction from the NFC component, the security component of the transaction card may generate the encrypted code and may provide the encrypted code to the wireless component of the transaction card. In some implementations, the encrypted code may include a numeric code, a character code, an alphanumeric code, and/or the like that is encrypted with an encryption technology. In some implementations, the encrypted code may provide secondary authentication (e.g., to the user and the user device) for accessing the secure application of the application platform. In some implementations, the security component may generate, and provide to the wireless component, a secure mechanism, such as an OTP token, an encrypted token, an encrypted code, and/or the like.

As further shown in FIG. 1E, and by reference number 165, the wireless component of the transaction card may provide the encrypted code to the user device, and the user device may receive the encrypted code. In some implementations, the user device may store the encrypted code. In some implementations, the user device may decrypt the encrypted code to generate a code, and may display the code to the user.

In some implementations, and as further shown in FIG. 1E, when the sensor component of the transaction card senses the gesture with the transaction card, the sensor component may communicate directly with the security component or with the security component via the wireless component (e.g., as shown by the dashed lines). In such implementations, the transaction card may include a standalone component (e.g., a microcontroller unit or MCU) or a component (e.g., a MCU) integrated within the sensor component that causes the transaction card to be energized (or wake up) when the gesture is detected.

Figure 1F:
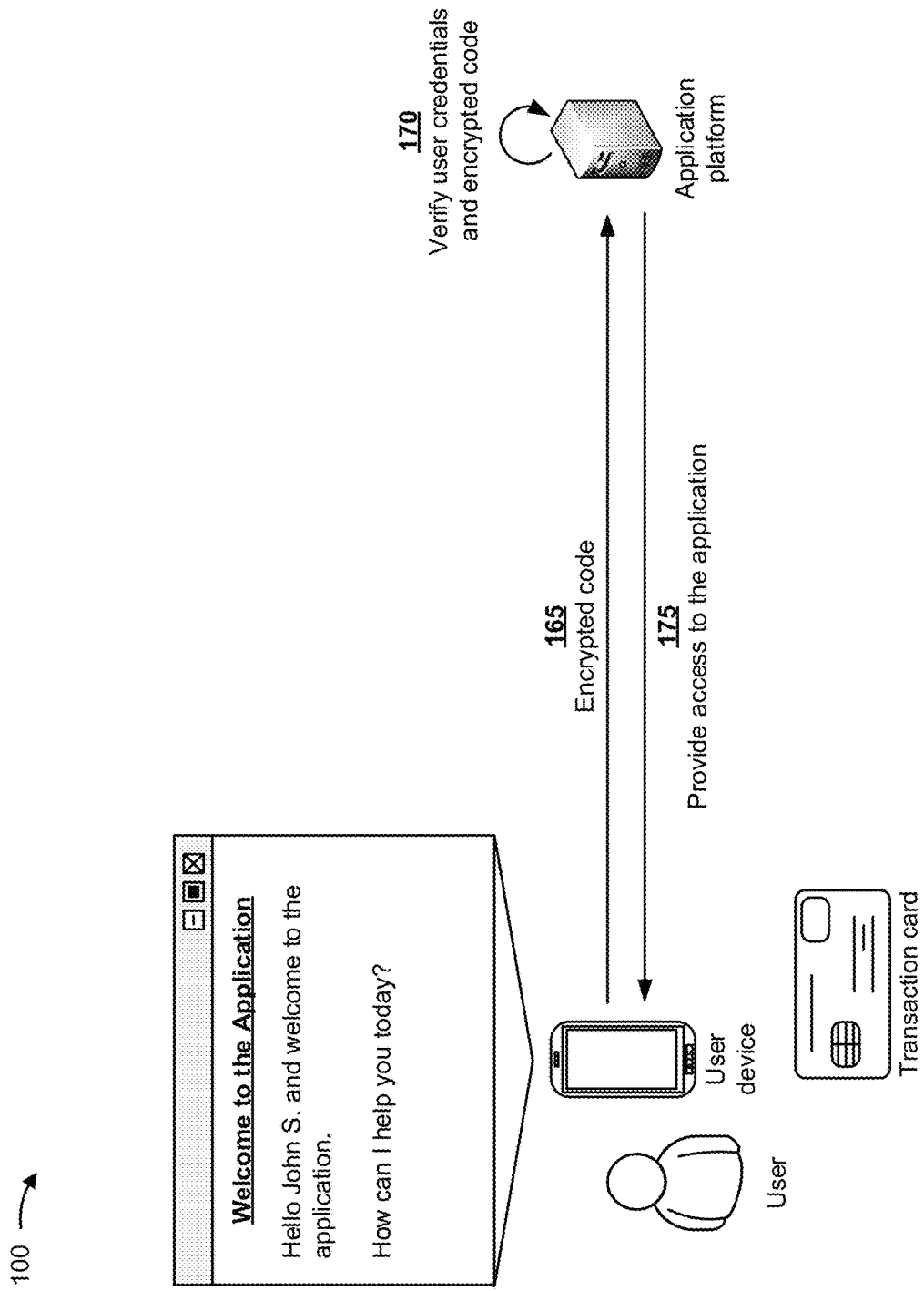

As shown in FIG. 1F, and by reference number 165, the user device may provide the encrypted code to the application platform. In some implementations, the user device may automatically provide the encrypted code to the application platform. In some implementations, when the user device decrypts the encrypted code to generate a code and displays the code to the user, the user may utilize the user device to cause the code to be provided to the application platform. In some implementations, the application platform may receive the encrypted code and may decrypt the encrypted code to generate the code. In some implementations, the application platform may receive the code and may not need to decrypt the code since the user device already decrypted the encrypted code.

As further shown in FIG. 1F, and by reference number 170, the application platform may verify the user credentials (e.g., the user name and the password) and the encrypted code. In some implementations, the user credentials may represent a first authentication factor of a two factor authentication (e.g., of the user and the user device) for accessing the secure application, and the encrypted code may represent a second authentication factor of the two factor authentication. In some implementations, the application platform may verify the user credentials and the encrypted code by comparing the user credentials and the encrypted code to authentication information stored by the application platform. If the authentication information matches the user credentials and the encrypted code, the application platform may verify the user credentials and the encrypted code. If the authentication information does not match the user credentials and/or the encrypted code, the application platform may not verify the user credentials and the encrypted code.

As further shown in FIG. 1F, and by reference number 175, if the application platform verifies the user credentials and the encrypted code, the application platform may provide the user device with access to the secure application. In some implementations, if the application platform does not verify the user credentials and the encrypted code, the application platform may not provide the user device with access to the secure application. As further shown in FIG. 1F, when the user device is provided access to the secure application, the user device may display, to the user and via a user interface, information associated with the secure application.

Figure 1G:
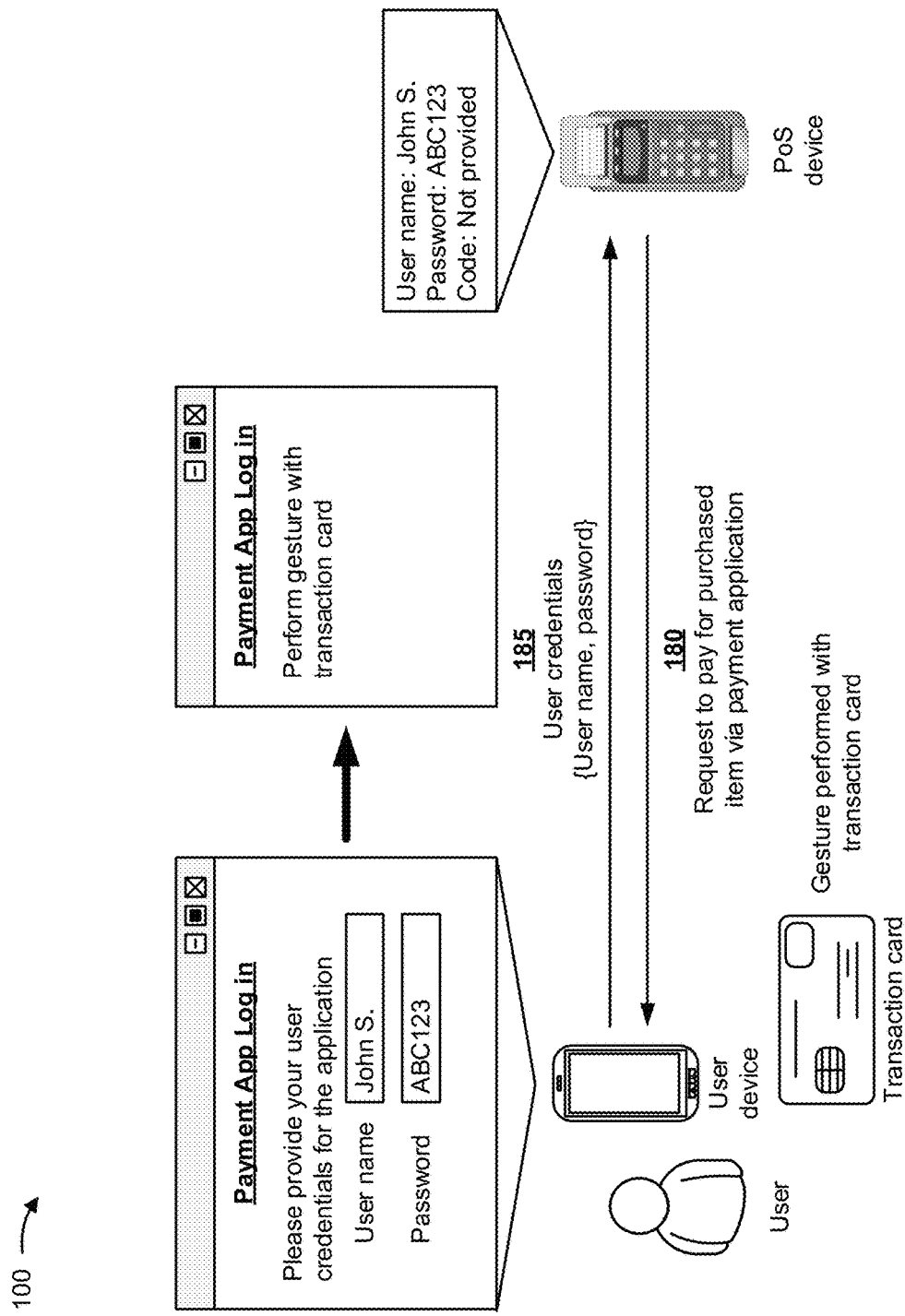

As shown in FIG. 1G, now assume that the user utilizes the user device with a point-of-sale (PoS) device in order to pay for a purchased item via a payment application associated with the PoS device. As further shown in FIG. 1G, and by reference number 180, based on the transaction, the PoS device may provide, to the user device, a request to pay for the purchased item via the payment application. As further shown in FIG. 1G, and by reference number 185, the user may utilize the user device to access a log in user interface of the payment application, and to provide a first authentication of the user (e.g., the user credentials, such as a user name and a password) to the PoS device. The PoS device may receive the user credentials, including the user name (e.g., John S.) and the password (e.g., ABC123). In some implementations, in addition to the first authentication, the PoS device may require the user to provide a secondary authentication (e.g., a secure access code) in order to pay for the purchased item.

As further shown in FIG. 1G, the user interface of the payment application may request that the user perform a gesture with the transaction card. In some implementations, the gesture may include a gesture of the transaction card (e.g., and sensed by the transaction card) and/or a gesture performed by the user and sensed by the transaction card. As further shown in FIG. 1G, the gesture may be performed with the transaction card, and the transaction card may sense the gesture.

Figure 1H:
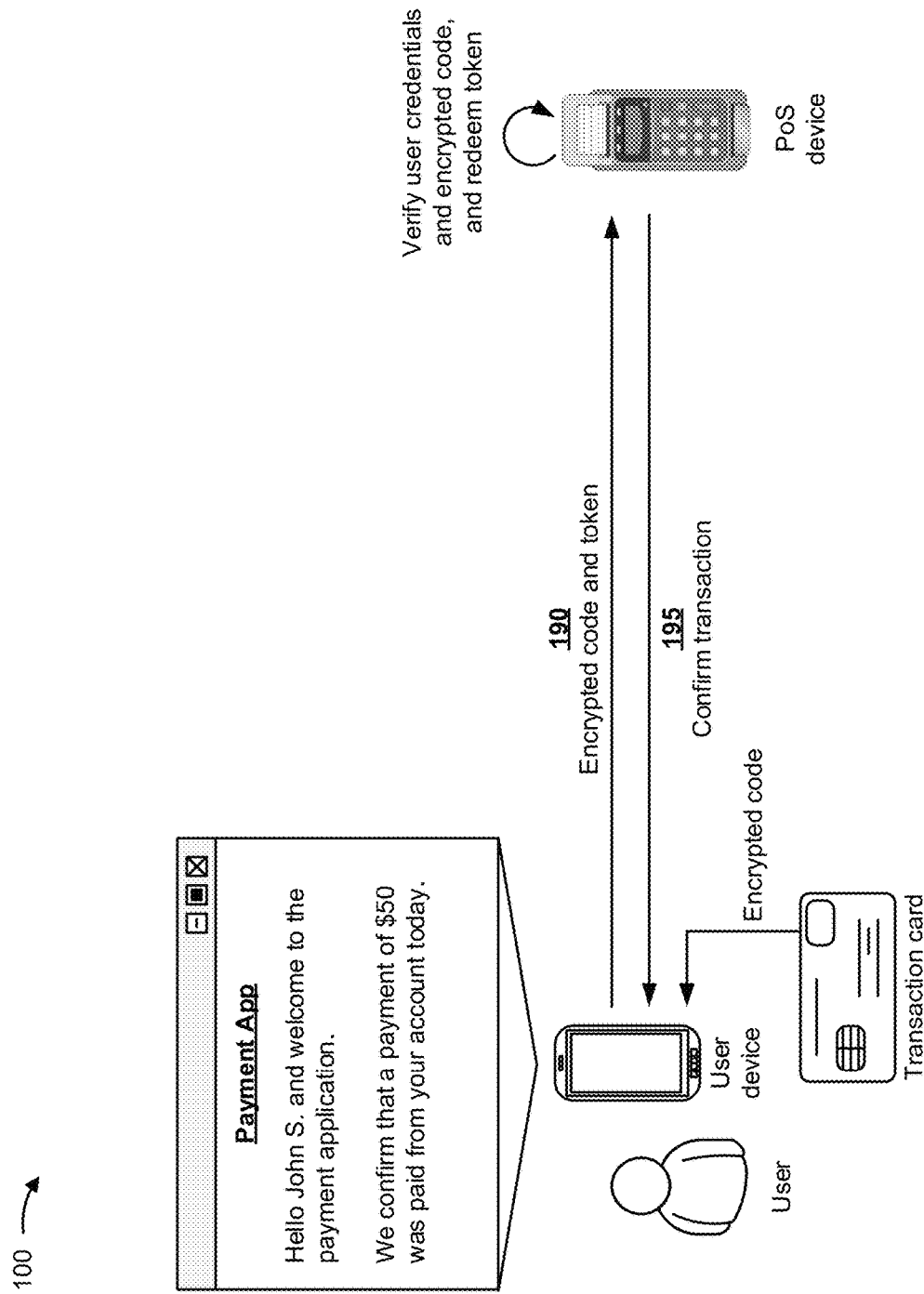

As shown in FIG. 1H, based on sensing the gesture, the transaction card may generate and provide an encrypted code to the user device, as described above in connection with FIG. 1E. The user device may receive the encrypted code, and may store the encrypted code. In some implementations, the user device may decrypt the encrypted code to generate a code, and may display the code to the user.

As further shown in FIG. 1H, and by reference number 190, the user device may provide the encrypted code, and a token to pay for the purchased item, to the PoS device. In some implementations, the user device may automatically provide the encrypted code and the token to the PoS device. In some implementations, when the user device decrypts the encrypted code to generate a code and displays the code to the user, the user may utilize the user device to cause the code and token to be provided to the PoS device. In some implementations, the PoS device may receive the encrypted code and may decrypt the encrypted code to generate the code. In some implementations, the PoS device may receive the code and may not need to decrypt the code since the user device already decrypted the encrypted code.

As further shown in FIG. 1H, the PoS device may verify the user credentials (e.g., the user name and the password) and the encrypted code. In some implementations, the user credentials may represent a first authentication factor of a two factor authentication (e.g., of the user and the user device) for paying for the purchased item, and the encrypted code may represent a second authentication factor of the two factor authentication. In some implementations, the PoS device may verify the user credentials and the encrypted code by comparing the user credentials and the encrypted code to authentication information stored by the PoS device or a device associated with the PoS device. If the authentication information matches the user credentials and the encrypted code, the PoS device may verify the user credentials and the encrypted code. If the authentication information does not match the user credentials and/or the encrypted code, the PoS device may not verify the user credentials and the encrypted code.

As further shown in FIG. 1H, if the PoS device verifies the user credentials and the encrypted code, the PoS device may redeem the token as payment for the purchased item. In some implementations, if the PoS device does not verify the user credentials and the encrypted code, the PoS device may not redeem the token and may reject the transaction. As further shown in FIG. 1H, and by reference number 195, if the PoS device redeems the token as payment for the purchased item, the PoS device may provide, to the user device, information indicating confirmation of the transaction (e.g., successful payment for the purchased item). In some implementations, if the PoS device does not redeem the token as payment for the purchased item, the PoS device may provide, to the user device, information indicating denial of the transaction (e.g., unsuccessful payment for the purchased item).

Although not described above, in some implementations, the transaction card may include one or more memories, and one or more processors, communicatively coupled to the one or more memories, that cause the transaction card to perform one or more of the functions described above in connection with FIGS. 1A-1H.

Although implementations, described above, have been described in connection with a mobile user device, in some implementations, the user device may be a stationary user device, such as desktop computer. In such implementations, the desktop computer may include a NFC component (e.g., via a dongle attachment or internal to the desktop computer) so that the desktop computer may generate a NFC signal to energize the NFC component of the transaction card. In such implementations, the desktop computer may not include a NFC component when the NFC component of the transaction card is energized based on a gesture.

In some implementations, a user of the user device may utilize a transaction card, in a manner similar to that described herein, to provide secondary authentication for accessing a paycheck service (e.g., to protect the confidentiality of payroll information, employee information, and/or the like). In some implementations, a user of the user device may utilize a transaction card, in a manner similar to that described herein, to provide secondary authentication for accessing a company intranet (e.g., to limit access to employees of the company and/or other parties authorized by the company). In some implementations, a user of the user device may utilize a transaction card, in a manner similar to that described herein, to provide secondary authentication for accessing a cloud service (e.g., to protect sensitive data maintained by and/or shared among cloud users). In some implementations, a user of the user device may utilize a transaction card, in a manner similar to that described herein, to provide secondary authentication for accessing a docketing system (e.g., to maintain confidentiality of client information, to prevent essential docket information from being compromised, and/or the like).

In some implementations, a user of the user device may utilize a transaction card, in a manner similar to that described herein, to provide secondary authentication for an online money transfers (e.g., to protect information associated with financial transactions, personal identity information, and/or the like). In some implementations, a user of the user device may utilize a transaction card, in a manner similar to that described herein, to provide secondary authentication for accessing medical records (e.g., to prevent unauthorized access to private information associated with patients, such as physical health history, mental health history, and/or the like). In some implementations, a user of the user device may utilize a transaction card, in a manner similar to that described herein, to provide secondary authentication for accessing a merchant web site (e.g., to protect information associated with financial transactions between the user and the merchant, identify information of the user, and/or the like).

In this way, a transaction card may be utilized to automatically provide secondary authentication for accessing a secure application, which may remove human subjectivity and waste from an authentication process, and which may improve speed and efficiency of the authentication process and conserve computing resources (e.g., processors, memory, and/or the like). Furthermore, implementations described herein use a computerized process to perform tasks or roles that were not previously performed or were previously performed using subjective human intuition or input. For example, utilizing a transaction card to automatically provide secondary authentication for accessing a secure application eliminates a need for a user to receive a text message with an access code and correctly input the access code. Finally, utilizing a transaction card to automatically provide secondary authentication for accessing a secure application conserves computing resources (e.g., processors, memory, and/or the like) that would otherwise be wasted in providing other forms of secondary authentication.

As indicated above, FIGS. 1A-1H are provided merely as examples. Other examples are possible and may differ from what was described with regard to FIGS. 1A-1H.

Figure 2:
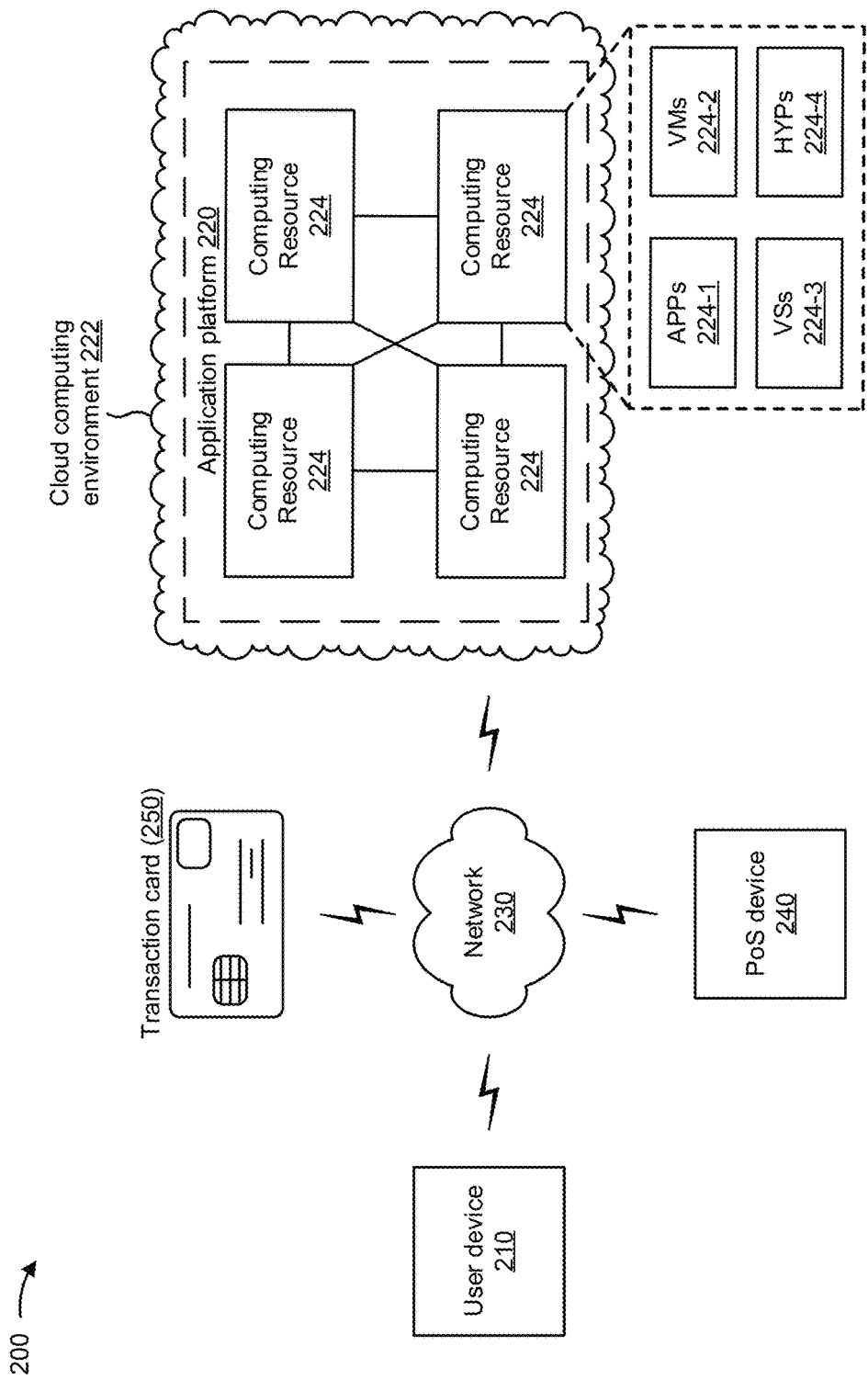
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, an application platform 220, a network 230, a point-of-sale (PoS) device 240, and a transaction card 250. Devices of environment 200 may interconnect via wired connections, wireless connections, or a combination of wired and wireless connections.

User device 210 includes one or more devices capable of receiving, generating, storing, processing, and/or providing information, such as information described herein. For example, user device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device 210 may receive information from and/or transmit information to application platform 220, PoS device 240, and/or transaction card 250.

Application platform 220 includes one or more devices that provide a secure application (e.g., a company email application, a banking application, a paycheck application, a medical history application, and/or the like) to be accessed by user device 210, PoS device 240, and/or transaction card 250. In some implementations, application platform 220 may be designed to be modular such that certain software components may be swapped in or out depending on a particular need. As such, application platform 220 may be easily and/or quickly reconfigured for different uses. In some implementations, application platform 220 may receive information from and/or transmit information to one or more user devices 210.

In some implementations, as shown, application platform 220 may be hosted in a cloud computing environment 222. Notably, while implementations described herein describe application platform 220 as being hosted in cloud computing environment 222, in some implementations, application platform 220 may not be cloud-based (i.e., may be implemented outside of a cloud computing environment) or may be partially cloud-based.

Cloud computing environment 222 includes an environment that hosts application platform 220. Cloud computing environment 222 may provide computation, software, data access, storage, etc. services that do not require end-user knowledge of a physical location and configuration of system(s) and/or device(s) that hosts application platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host application platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by user device 210, PoS device 240, and/or transaction card 250. Application 224-1 may eliminate a need to install and execute the software applications on user device 210, PoS device 240, and/or transaction card 250. For example, application 224-1 may include software associated with application platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of user device 210, PoS device 240, and/or transaction card 250 or an operator of application platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

PoS device 240 includes a device that conducts and completes a transaction at a time and place of the transaction. PoS device 240 may calculate an amount owed by a customer (e.g., a user), may indicate that amount, may prepare an invoice for the customer, and may indicate options for the customer to make payment. PoS device 240 may be point at which a customer makes a payment to a merchant in exchange for goods or after provision of a service. After receiving payment, PoS device 240 may issue a printed or an electronic receipt for the transaction.

Transaction card 250 includes a transaction card capable of communicating with the components of environment 200 (e.g., via Bluetooth communication, BLE communication, Wi-Fi communication, a NFC session, and/or the like). Transaction card 250 may be capable of communicating data for accessing a secure application associated with user device 210, application platform 220, and/or PoS device 250. For example, transaction card 250 may communicate data, including a token, transaction card identification information (e.g., an account identifier, a cardholder identifier, and/or the like), account information, banking information, and/or the like, so that user device 210, application platform 220, and/or PoS device 250 may access a secure application. In some implementations, transaction card 250 may include an antenna to communicate data associated with transaction card 250. The antenna may be a passive radio frequency (RF) antenna, an active RF antenna, and/or a battery-assisted RF antenna. In some implementations, transaction card 250 may include a body or a substrate that supports and/or houses a NFC component, a security component, a wireless component, and a sensor component.

The NFC component may include a component supporting communication protocols that enable transaction card 250 and another device (e.g., user device 210, PoS device 240, and/or the like) to establish communication by bringing transaction card 250 and other device within a particular distance of each other. In some implementations, the NFC component may enable transaction card 250 to be used with contactless payment systems (e.g., PoS device 240) so that transaction card 250 can perform transactions (e.g., make contactless payments).

The security component may include a component that generates a secure mechanism (e.g., a one-time password (OTP) token, an encrypted token, an encrypted code, and/or the like) when transaction card 250 is utilize to perform transactions (e.g., make contactless payments, provide secondary authentication for accessing a secure application, and/or the like). In some implementations, the secure mechanism may provide authentication for the user when the user attempts to access a secure application with user device 210, accesses the funds on transaction card 250, accesses accounts associated with the user (e.g., bank accounts, credit card accounts, debit card accounts, and/or the like), and/or the like. In some implementations, when the NFC component is energized by user device 210 and/or a contactless payment system (e.g., PoS device 240), the NFC component being energized may cause the security component to automatically generate a secure mechanism (e.g., an encrypted token) for providing secondary authentication for a user of user device 210 and/or PoS device 240. The security component may provide the secure mechanism to user device 210 and/or PoS device 240 via the wireless component.

The wireless component may include component that supports a particular wireless technology standard (e.g., Bluetooth, Zigbee, WiFi, and/or the like), and enables transaction card 250 to communicate wirelessly with other devices (e.g., user device 210 and/or PoS device 250) over short distances (e.g., via a local area network (LAN), a personal area network (PAN), and/or the like). In some implementations, the wireless component may enable transaction card 250 to communicate the secure mechanism to user device 210 so that user device 210 may be authenticated to access a secure application provided by application platform 220 and/or PoS device 250.

The sensor component may include a component that enables transaction card 250 to identify performance of a gesture with transaction card 250 (e.g., tapping transaction card 250 on user device 210 and/or PoS device 240, moving transaction card 250 in a particular pattern, and/or the like), performance of a gesture by a user of transaction card 250 (e.g., moving a finger or a hand in a particular pattern near transaction card 250, tapping transaction card 250 with a finger, and/or the like). In some implementations, the sensor component may include an accelerometer, a photodetector, a gyroscope, a pressure sensor, an ultrasonic transceiver, and/or the like.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
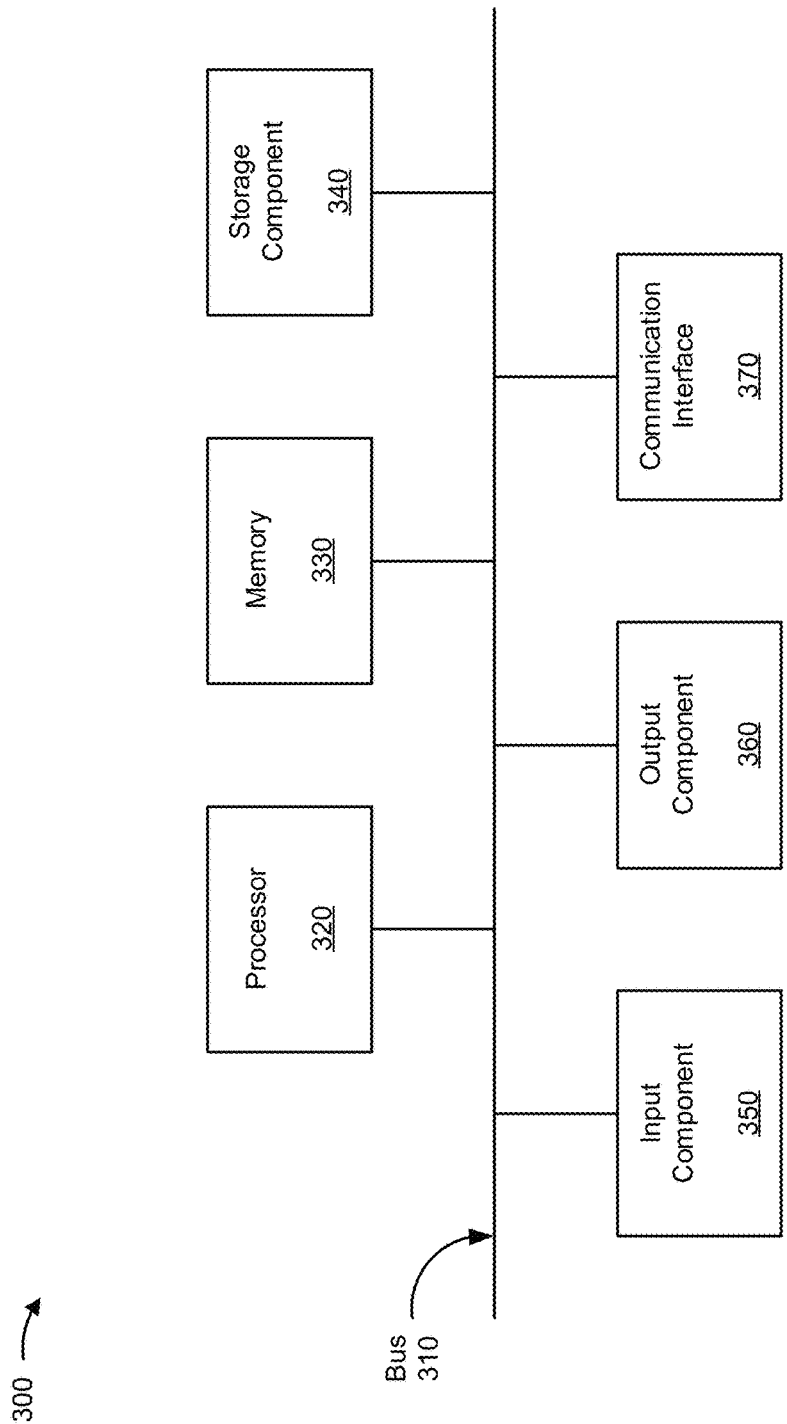
FIG. 3 is a diagram of example components of one or more devices of FIG. 2.

FIG. 3 is a diagram of example components of a device 300. Device 300 may correspond to user device 210, application platform 220, computing resource 224, PoS device 240, and/or transaction card 250. In some implementations, user device 210, application platform 220, computing resource 224, PoS device 240, and/or transaction card 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for utilizing a transaction card to provide secondary authentication for accessing a secure application with a user device. In some implementations, one or more process blocks of FIG. 4 may be performed by transaction card 250. In some implementations, one or more process blocks of FIG. 4 may be performed by another device or a group of devices separate from or including transaction card 250, such as user device 210, application platform 220, and/or PoS device 240.

As shown in FIG. 4, process 400 may include receiving, by a transaction card, a signal from a user device attempting to access a secure application (block 410). For example, transaction card 250 may receive a signal from user device 210 attempting to access a secure application. In some implementations, a user may utilize user device 210 to access a log in user interface of a secure application, and to generate a request to access the secure application. User device 210 may provide the request to access the secure application to application platform 220. The request to access the secure application may include a first authentication of the user (e.g., the user credentials, such as a user name and a password).

When user device 210 provides the request to access the secure application to application platform 220, user device 210 may generate a signal. In some implementations, the signal may include an electromagnetic signal based on a short-range wireless technology standard, such as a NFC signal. In some implementations, if transaction card 250 is within close proximity (e.g., a few centimeters) to user device 210, transaction card 250 may receive the signal generated by user device 210. In some implementations, if transaction card 250 is not within close proximity to user device 210, transaction card 250 may not receive the signal generated by user device 210.

In this way, transaction card 250 may receive the signal from user device 210 attempting to access the secure application.

As further shown in FIG. 4, process 400 may include energizing a near-field communication (NFC) component of the transaction card based on the signal from the user device (block 420). For example, transaction card 250 may energize a near-field communication (NFC) component of transaction card 250 based on the signal from user device 210. In some implementations, transaction card 210 may include a NFC component, a security component, and a wireless component. When transaction card 250 receives the signal generated by user device 210, the generated signal may cause the NFC component of transaction card 250 to be energized (e.g., wake up). In some implementations, the electromagnetic induction of the generated signal may cause the NFC component to be energized.

In this way, transaction card 250 may energize the NFC component of transaction card 250 based on the signal from user device 210.

As further shown in FIG. 4, process 400 may include causing, via the NFC component, a security component of the transaction card to generate an encrypted code (block 430). For example, transaction card 250 may cause, via the NFC component, a security component of transaction card 250 to generate an encrypted code. In some implementations, the NFC component of transaction card 250 may instruct the security component of transaction card 250 to generate an encrypted code. In some implementations, when the NFC component is energized, the action of being energized may cause the NFC component to automatically instruct the security component to generate an encrypted code. In such implementations, the NFC component may be programmed to automatically generate the instruction for the security component whenever the NFC component detects the signal (e.g., a NFC signal) from user device 210, and is energized. Based on receiving the instruction from the NFC component, the security component of transaction card 250 may generate the encrypted code.

In this way, transaction card 250 may cause, via the NFC component, the security component of transaction card 250 to generate the encrypted code.

As further shown in FIG. 4, process 400 may include providing, via the security component, the encrypted code to a wireless component of the transaction card (block 440). For example, transaction card 250 may provide, via the security component, the encrypted code to a wireless component of transaction card 250. In some implementations, the security component of transaction card 250 may provide the encrypted code to the wireless component of transaction card 250. In some implementations, the encrypted code may include a numeric code, a character code, an alphanumeric code, and/or the like that is encrypted with an encryption technology. In some implementations, the encrypted code may provide secondary authentication (e.g., to the user and user device 210) for accessing the secure application of application platform 220. In some implementations, the security component may generate, and provide to the wireless component, a secure mechanism, such as an OTP token, an encrypted token, an encrypted code, and/or the like.

In this way, transaction card 250 may provide, via the security component, the encrypted code to the wireless component of transaction card 250.

As further shown in FIG. 4, process 400 may include providing, via the wireless component, the encrypted code to the user device to cause the user device to utilize the encrypted code as secondary authentication for accessing the secure application (block 450). For example, transaction card 250 may provide, via the wireless component, the encrypted code to user device 210 to cause user device 210 to utilize the encrypted code as secondary authentication for accessing the secure application. In some implementations, the wireless component of transaction card 250 may provide the encrypted code to user device 210, and user device 210 may receive the encrypted code. In some implementations, user device may provide the encrypted code to application platform 220. In some implementations, application platform 220 may receive the encrypted code and may decrypt the encrypted code to generate a code.

In some implementations, application platform 220 may verify the user credentials (e.g., the user name and the password) and the encrypted code. In some implementations, the user credentials may represent a first authentication factor of a two factor authentication (e.g., of the user and the user device) for accessing the secure application, and the encrypted code may represent a second authentication factor of the two factor authentication. In some implementations, application platform 220 may verify the user credentials and the encrypted code by comparing the user credentials and the encrypted code to authentication information stored by application platform 220. If the authentication information matches the user credentials and the encrypted code, application platform 220 may verify the user credentials and the encrypted code. If application platform 220 verifies the user credentials and the encrypted code, application platform 220 may provide user device 210 with access to the secure application.

In this way, transaction card 250 may provide, via the wireless component, the encrypted code to user device 210 to cause user device 210 to utilize the encrypted code as secondary authentication for accessing the secure application.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of another example process 500 for utilizing a transaction card to provide secondary authentication for accessing a secure application with a user device. In some implementations, one or more process blocks of FIG. 5 may be performed by transaction card 250. In some implementations, one or more process blocks of FIG. 5 may be performed by another device or a group of devices separate from or including transaction card 250, such as user device 210, application platform 220, and/or PoS device 240.

As shown in FIG. 5, process 500 may include detecting performance of a gesture, with a sensor component of a transaction card, based on an instruction from a user device attempting to access a secure application (block 510). For example, transaction card 250 may detect performance of a gesture, with a sensor component of transaction card 250, based on an instruction from user device 210 attempting to access a secure application. In some implementations, a user may utilize user device 210 to access a log in user interface of the secure application, and to generate a request to access the secure application. The request to access the secure application may include a first authentication of the user (e.g., the user credentials, such as a user name and a password). The user interface of the secure application may request that the user perform a gesture with transaction card 250. In some implementations, the gesture may include a gesture of transaction card 250 (e.g., and sensed by transaction card 250), a gesture performed by the user and sensed by transaction card 250, and/or the like.

In some implementations, when the gesture is performed, the sensor component of transaction card 250 may sense the gesture with transaction card 250. In some implementations, if the sensor component is an accelerometer, the sensor component may sense contact with transaction card 250, movement of transaction card 250, and/or the like. In some implementations, if the sensor component is a light sensor, the sensor component may sense non-contact with transaction card 250, movement of transaction card 250, and/or the like.

In this way, transaction card 250 may detect the performance of the gesture, with the sensor component of transaction card 250, based on the instruction from user device 210 attempting to access the secure application.

As further shown in FIG. 5, process 500 may include energizing a near-field communication (NFC) component of the transaction card based on detecting the performance of the gesture (block 520). For example, transaction card 250 may energize a NFC component of transaction card 250 based on detecting the performance of the gesture. In some implementations, when the sensor component of transaction card 250 senses the gesture with transaction card 250, the sensor component may cause the NFC component of transaction card 250 to be energized (e.g., wake up). In some implementations, when the sensor component senses the gesture, the sensor component may provide an instruction, to the NFC component, that causes the NFC component to be energized.

In this way, transaction card 250 may energize the NFC component of transaction card 250 based on detecting the performance of the gesture.

As further shown in FIG. 5, process 500 may include causing, via the NFC component, a security component of the transaction card to generate an encrypted code (block 530). For example, transaction card 250 may cause, via the NFC component, a security component of transaction card 250 to generate an encrypted code. In some implementations, the NFC component of transaction card 250 may instruct the security component of transaction card 250 to generate an encrypted code. In some implementations, when the NFC component is energized, the action of being energized may cause the NFC component to automatically instruct the security component to generate an encrypted code. In such implementations, the NFC component may be programmed to automatically generate the instruction for the security component whenever the NFC component receives the instruction from the sensor component, and is energized. In some implementations, based on receiving the instruction from the NFC component, the security component of transaction card 250 may generate the encrypted code.

In this way, transaction card 250 may cause, via the NFC component, the security component of transaction card 250 to generate the encrypted code.

As further shown in FIG. 5, process 500 may include providing, via the security component, the encrypted code to a wireless component of the transaction card (block 540). For example, transaction card 250 may provide, via the security component, the encrypted code to a wireless component of transaction card 250. In some implementations, the security component of transaction card 250 may provide the encrypted code to the wireless component of transaction card 250. In some implementations, the encrypted code may include a numeric code, a character code, an alphanumeric code, and/or the like that is encrypted with an encryption technology. In some implementations, the encrypted code may provide secondary authentication (e.g., to the user and the user device) for accessing the secure application of application platform 220. In some implementations, the security component may generate, and provide to the wireless component, a secure mechanism, such as an OTP token, an encrypted token, an encrypted code, and/or the like.

In this way, transaction card 250 may provide, via the security component, the encrypted code to the wireless component of transaction card 250.

As further shown in FIG. 5, process 500 may include providing, via the wireless component, the encrypted code to the user device to cause the user device to utilize the encrypted code as secondary authentication for accessing the secure application (block 550). For example, transaction card 250 may provide, via the wireless component, the encrypted code to user device 210 to cause user device 210 to utilize the encrypted code as secondary authentication for accessing the secure application. In some implementations, the wireless component of transaction card 250 may provide the encrypted code to user device 210, and user device 210 may receive the encrypted code. In some implementations, user device 210 may provide the encrypted code to application platform 210. In some implementations, application platform 220 may receive the encrypted code and may decrypt the encrypted code to generate a code.

In some implementations, application platform 220 may verify the user credentials (e.g., the user name and the password) and the encrypted code. In some implementations, the user credentials may represent a first authentication factor of a two factor authentication (e.g., of the user and the user device) for accessing the secure application, and the encrypted code may represent a second authentication factor of the two factor authentication. In some implementations, application platform may verify the user credentials and the encrypted code by comparing the user credentials and the encrypted code to authentication information stored by application platform 220. If the authentication information matches the user credentials and the encrypted code, application platform 220 may verify the user credentials and the encrypted code. If application platform 220 verifies the user credentials and the encrypted code, application platform 220 may provide user device 210 with access to the secure application.

In this way, transaction card 250 may provide, via the wireless component, the encrypted code to user device 210 to cause user device 210 to utilize the encrypted code as secondary authentication for accessing the secure application.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Some implementations described herein may utilize a transaction card to provide secondary authentication for accessing a secure application with a user device. For example, the transaction card may include a near-field communication (NFC) component, a security component, and a wireless component. The transaction card may receive a signal from a user device attempting to access a secure application (e.g., a banking application), and the NFC component may be energized based on the signal. The security component may generate an encrypted code based on the NFC component being energized, and may provide the encrypted code to the wireless component. The wireless component may provide the encrypted code to the user device to permit the user device to utilize the encrypted code as authentication for accessing the secure application.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A transaction card, comprising:
a near-field communication (NFC) component;
a security component;
a wireless component;
a sensor component;
a capacitive component;
one or more memories; and
one or more processors communicatively coupled to the one or more memories,
one or more of the NFC component, the security component, the wireless component, or the one or more processors to:
receive a signal from a user device attempting to access a secure application stored on the user device;
detect a particular movement of the transaction card;
store, based on detecting the particular movement of the transaction card, energy from the user device in the capacitive component;
energize the NFC component using the energy stored in the capacitive component based on receiving the signal from the user device and based on detecting the particular movement of the transaction card;
cause the security component to generate an encrypted code based on the NFC component being energized;
provide, via the security component, the encrypted code to the wireless component; and
provide, via the wireless component, the encrypted code to the user device,
the user device being authenticated to access the secure application based on the encrypted code.

2. The transaction card of claim 1, where:
the user device is associated with a user,
the user is associated with user credentials that provide a first authentication factor for accessing the secure application, and
the encrypted code provides a second authentication factor for accessing the secure application.

3. The transaction card of claim 1, where one or more of the NFC component, the security component, the wireless component, the sensor component, the capacitive component, or the one or more processors are to:
detect, via the sensor component, performance of a gesture on the transaction card;
energize the NFC component based on detecting the performance of the gesture on the transaction card;
cause the security component to generate another encrypted code based on the NFC component being energized;
provide, via the security component, the other encrypted code to the wireless component; and
provide, via the wireless component, the other encrypted code to the user device to permit the user device to utilize the other encrypted code as authentication for accessing another secure application stored on the user device.

4. The transaction card of claim 1, where the sensor component includes one or more of:
an accelerometer,
a photodetector,
a gyroscope,
a pressure sensor, or
an ultrasonic transceiver.

5. The transaction card of claim 1, where the particular movement of the transaction card is in a particular pattern.

6. The transaction card of claim 1, where the secure application is an application for accessing a bank account associated with a user of the user device.

7. The transaction card of claim 1, where the wireless component is configured to communicate via a wireless local area network wireless technology standard or a wireless personal area network wireless technology standard.

8. A method, comprising:
receiving, by a transaction card, a signal from a user device,
the signal having been generated by the user device based on an attempt to utilize the user device to pay for a secure transaction, and
the transaction card including:
a near-field communication (NFC) component,
a security component,
a sensor component,
a capacitive component, and
a wireless component;
detecting, by the transaction card, a particular movement of the transaction card;
storing, by the capacitive component of the transaction card and based on detecting the particular movement of the transaction card, energy from the user device;
energizing, by the transaction card, the NFC component using the energy stored in the capacitive component based on receiving the signal from the user device and based on detecting the particular movement of the transaction card;
instructing, by the NFC component of the transaction card, the security component to generate an encrypted code based on the NFC component being energized;
generating, by the security component of the transaction card, the encrypted code based on the NFC component instructing the security component to generate the encrypted code;
providing, by the security component of the transaction card, the encrypted code to the wireless component; and
providing, by the wireless component of the transaction card, the encrypted code to the user device,
the user device being authenticated to pay for the secure transaction based on the encrypted code.

9. The method of claim 8, where:
the user device is associated with a user,
the user is associated with user credentials that provide a first authentication factor associated with paying for the secure transaction, and
the encrypted code provides a second authentication factor associated with paying for the secure transaction.

10. The method of claim 8, where the secure transaction includes a transaction associated with a point of sale device.

11. The method of claim 8, where the secure transaction includes a transaction associated with accessing a bank account of a user associated with the user device.

12. The method of claim 8, further comprising:
detecting, by the sensor component, performance of a gesture on the transaction card;
energizing, by the transaction card, the NFC component based on detecting the performance of the gesture on the transaction card;
causing the security component to generate another encrypted code based on the NFC component being energized;

providing, by the security component of the transaction card, the other encrypted code to the wireless component; and providing, by the wireless component of the transaction card, the other encrypted code to the user device to permit the user device to utilize the other encrypted code as authentication for accessing a secure application.

13. The method of claim 8, where the sensor component includes one or more of:
an accelerometer,
a photodetector,
a gyroscope,
a pressure sensor, or
an ultrasonic transceiver.

14. The method of claim 12, where the particular movement of the transaction card is in a particular pattern.

15. A non-transitory computer-readable medium storing instructions, the instructions comprising:
one or more instructions that, when executed by one or more processors of a transaction card that includes a near-field communication (NFC) component, a wireless component, a security component, a capacitive component, and a sensor component, cause the one or more processors to:
detect, via the sensor component, a movement of the transaction card;
store, based on detecting a particular movement of the transaction card, energy from a user device in the capacitive component;
energize the NFC component using the energy stored in the capacitive component based on detecting the particular movement of the transaction card;
cause the security component to generate an encrypted code based on the NFC component being energized;
provide, via the security component, the encrypted code to the wireless component; and
provide, via the wireless component, the encrypted code to the user device,
the user device being authenticated to access a secure application, stored on the user device, based on the encrypted code.

16. The non-transitory computer-readable medium of claim 15, where the sensor component includes one or more of:
an accelerometer,
a photodetector, or
a gyroscope.

17. The non-transitory computer-readable medium of claim 15, where the particular movement of the transaction card is in a particular pattern.

18. The non-transitory computer-readable medium of claim 15, where the one or more instructions, when executed by the one or more processors, further cause the one or more processors to:
receive, from the user device, a signal generated by the user device when the user device attempts to access another secure application;
energize the NFC component based on receiving the signal;
cause the security component to generate another encrypted code based on the NFC component being energized;
provide, via the security component, the other encrypted code to the wireless component; and
provide, via the wireless component, the other encrypted code to the user device to permit the user device to utilize the other encrypted code as authentication for accessing the other secure application.

19. The non-transitory computer-readable medium of claim 15, where the one or more instructions, when executed by the one or more processors, further cause the one or more processors to:
detect, by the sensor component, performance of a gesture on the transaction card after an attempt to access another secure application is detected,
the other secure application being an application for accessing a bank account associated with a user of the user device; and
energize the NFC component based on detecting the performance of the gesture on the transaction card.

20. The non-transitory computer-readable medium of claim 15, where the user device is associated with a user,
the user being associated with user credentials that provide a first authentication factor for accessing the secure application, and
where the encrypted code provides a second authentication factor for accessing the secure application.

* * * * *